US012749829B2

(12) United States Patent
Xiao et al.

(10) Patent No.: US 12,749,829 B2
(45) Date of Patent: Sep. 29, 2026

(54) ANTENNA SYSTEM AND BASE STATION

(71) Applicant: HUAWEI TECHNOLOGIES CO., LTD., Shenzhen (CN)

(72) Inventors: Weihong Xiao, Dongguan (CN); Jianping Li, Dongguan (CN); Tao Pu, Shanghai (CN); Runxiao Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 67 days.

(21) Appl. No.: 17/827,727

(22) Filed: May 29, 2022

(65) Prior Publication Data

US 2022/0285858 A1 Sep. 8, 2022

Related U.S. Application Data

(63) Continuation of application No. PCT/CN2019/122283, filed on Nov. 30, 2019.

(51) Int. Cl.

*H01Q 21/28* (2006.01)
*H01Q 5/30* (2015.01)
*H01Q 9/04* (2006.01)

(52) U.S. Cl.

CPC ............... *H01Q 21/28* (2013.01); *H01Q 5/30* (2015.01); *H01Q 9/0414* (2013.01)

(58) Field of Classification Search

CPC .... H01Q 21/28; H01Q 1/405; H01Q 21/0025; H01Q 1/42

See application file for complete search history.

(56) References Cited

U.S. PATENT DOCUMENTS

| | | | | |
|---|---|---|---|---|
| 6,333,720 | B1 | 12/2001 | Ttl et al. | |
| 7,173,572 | B2 | 2/2007 | Teillet et al. | |
| 7,358,924 | B2 | 4/2008 | Boss et al. | |
| 2011/0175784 | A1 | 7/2011 | Moon et al. | |
| 2019/0123426 | A1* | 4/2019 | Bryce | H01Q 5/42 |
| 2020/0014097 | A1* | 1/2020 | Kim | H01Q 5/48 |

FOREIGN PATENT DOCUMENTS

| | | | |
|---|---|---|---|
| CN | 101465473 | A | 6/2009 |
| CN | 101695926 | A | 4/2010 |
| CN | 101714701 | A | 5/2010 |
| CN | 102395226 | A | 3/2012 |
| CN | 102714345 | A | 10/2012 |
| CN | 205723963 | U | 11/2016 |

(Continued)

OTHER PUBLICATIONS

Shi Wei:"Research on broadband low-profile base station antenna", Dec 2017, total 139 pages.

(Continued)

*Primary Examiner* — Dimary S Lopez Cruz
*Assistant Examiner* — Austin M Back

(57) ABSTRACT

This application provides an antenna system. The antenna system includes a first reflection panel, a first antenna array, and a second antenna array. The first antenna array and the second antenna array are stacked on the first reflection panel. The first antenna array and the second antenna array share the first reflection panel. The first antenna array and the second antenna array operate on different frequency bands.

14 Claims, 7 Drawing Sheets

(56) References Cited

FOREIGN PATENT DOCUMENTS

| | | | | | |
|---|---|---|---|---|---|
| CN | 106654596 | A | | 5/2017 | |
| CN | 108448258 | A | | 8/2018 | |
| CN | 108666742 | A | | 10/2018 | |
| CN | 109219905 | A | | 1/2019 | |
| CN | 109546369 | A | | 3/2019 | |
| EP | 2911238 | B1 | | 8/2015 | |
| EP | 3573179 | A1 | | 11/2019 | |
| JP | 2001127523 | A | | 5/2001 | |
| WO | 2017006959 | A1 | | 1/2017 | |
| WO | 2018077408 | A1 | | 5/2018 | |
| WO | 2019084720 | A1 | | 5/2019 | |
| WO | 2019154362 | A1 | | 8/2019 | |
| WO | 2019223304 | A1 | | 11/2019 | |
| WO | WO-2021078654 | A1 | * | 4/2021 | ............. H01Q 1/523 |

OTHER PUBLICATIONS

L. V. Knyazeva et al.:"The mathematical model of antenna and antenna-radome system", International Conference on Antenna Theory and Techniques, Sep. 9-12, 2003, Sevastopol, Ukraine pp. 667-670.
Jian Wei You et al.:"A New Method to Analyze Broadband Antenna-Radome Interactions in Time-Domain", IEEE Transactions On Antennas and Propagation, vol. 62, No. 1, Jan. 2014, total 11 pages.
Michael Thiel et al.:"A multiple-beam sector antenna with a dual planar reflectarray arrangement", Sep. 2006, total 4 pages.

* cited by examiner

ANTENNA SYSTEM AND BASE STATION

CROSS-REFERENCE TO RELATED APPLICATIONS

This application is a continuation of International Application No. PCT/CN2019/122283, filed on Nov. 30, 2019, the disclosure of which is hereby incorporated by reference in its entirety.

TECHNICAL FIELD

This application relates to the field of communication technologies, and in particular, to an antenna system and a base station.

BACKGROUND

With development of the communication industry, a requirement on a communication frequency band of a base station is increasingly high, and an operator expects that the base station has more communication frequency bands. However, antenna installation platform space resources on a site of the operator are limited. Therefore, when a base station is being configured, multi-band antennas of the base station uses a solution such as nesting or stacking to increase operating frequency bands of the base station. However, in a conventional technology, when antennas of different frequency bands are placed together in a nested or stacked manner, it is difficult to add an antenna of another frequency band to the base station once the base station is constructed.

SUMMARY

This application provides an antenna system and a base station to improve communication performance of the base station.

According to a first aspect, an antenna system is provided. The antenna system includes at least two antenna arrays operating on different frequency bands: a first antenna array and a second antenna array, where the first antenna array operates on a first operating frequency band, and the second antenna array operates on a second operating frequency band. For example, the first antenna array is a 5G antenna, and the second antenna array is a 2G, 3G, or 4G antenna. The antenna system further includes a first reflection panel. The first antenna array and the second antenna array are stacked on the first reflection panel, and the first antenna array and the second antenna array share the first reflection panel. During assembly, the second antenna array may be an antenna existing on a base station in a conventional technology, and the first antenna array is additional 5G antennas. The first antenna array and the first reflection panel form a module. The module is disposed on a side of the second antenna array that is away from a radiation area. The second antenna array and the first antenna array share the first reflection panel. As can be learned from the foregoing description, according to the antenna system provided in this embodiment of this application, different modules may be added as required to improve communication performance of the existing base station, thereby reducing costs of refitting the base station.

In an embodiment, a second feeding network feeding the second antenna array is further included, and the second feeding network is disposed between the second antenna array and the first antenna array. Disposing the second feeding network between the first antenna array and the second antenna array facilitates arrangement of the first antenna array and the first reflection panel.

In an embodiment, a radome is further included. The first antenna array, the second antenna array, and the second feeding network are disposed in the radome. The first antenna array and the second antenna array are protected by the disposed radome, thereby improving security of the two antenna arrays.

In an embodiment, the radome includes a first radome and a second radome. The first antenna array and the first reflection panel are disposed in the first radome. The second antenna array and the second feeding network are disposed in the second radome. The first antenna array and the second antenna array are separately protected by different radomes.

In an embodiment, there is one radome. The first antenna array, the second feeding network, and the second antenna array are disposed in one radome. The first antenna array and the second antenna array are protected together by one radome.

In an embodiment, a second reflection panel is further included. The second antenna array includes a first part of second antennas and a second part of second antennas. The first part of second antennas and the first antenna array are stacked on the first reflection panel, and the second part of second antennas are disposed on the second reflection panel. Some signals of the second antenna array are reflected by disposing the second reflection panel, thereby increasing a quantity of second antennas in the second antenna array.

In an embodiment, the first reflection panel and the second reflection panel are arranged along a second direction. The second direction is perpendicular to a first direction, and the first direction is a direction in which the first antenna array and the second antenna array are stacked. In this way, the quantity of second antennas in the second antenna array is increased, and a radiation effect from the second reflection panel on the first antenna array is avoided.

In an embodiment, a third antenna array is further included. The first antenna array, the second antenna array, and the third antenna array operate on different frequency bands. The third antenna array and the second part of second antennas are stacked on the second reflection panel. In this way, a communication coverage frequency band of the antenna system is increased.

In an embodiment, a radome is further included. The radome includes a first radome and a second radome. The first antenna array and the first reflection panel are disposed in the first radome. The second antenna array, the second feeding network, the third antenna array, and the second reflection panel are disposed in the second radome. The first antenna array, the second antenna array, and the third antenna array are separately protected by the first radome and the second radome.

In an embodiment, a radome is further included. The radome includes a first radome and a second radome. The first part of second antennas, the second feeding network, the first antenna array, and the first reflection panel are disposed in the first radome. The second part of second antennas, the third antenna array, and the second reflection panel are disposed in the second radome. The first antenna array, the second antenna array, and the third antenna array are separately protected by the first radome and the second radome.

In an embodiment, a phase shifter connected to the second feeding network is further included. The phase shifter is disposed in the second radome, and the first part of second antennas located in the first radome are connected to the phase shifter through a jumper. A signal is sent to a second antenna by using the phase shifter, and second antennas located in different radomes are connected through jumpers.

In an embodiment, a fourth antenna array is further included. The first antenna array, the second antenna array, the third antenna array, and the fourth antenna array operate on different frequency bands. The fourth antenna array, the second antenna array, and the third antenna array are stacked on the second reflection panel. In this way, a communication coverage frequency band of the antenna system is increased.

According to a second aspect, a base station is provided. The base station includes any one of the foregoing antenna systems and a digital phase shifter connected to the antenna system. According to the antenna system, different modules may be added as required to improve communication performance of the existing base station, thereby reducing costs of refitting the base station.

DESCRIPTION OF EMBODIMENTS

For ease of understanding an antenna system provided in embodiments of this application, an application scenario of the antenna system provided in the embodiments of this application is described first. An example of the antenna system provided in this application is applied to a base station. Construction of base stations is an important part of investment of mobile communication operators. The construction of base stations is generally performed based on factors such as coverage, call quality, investment benefit, construction difficulty, and maintenance convenience. With development of mobile communication network services towards the direction of digitization and packetization, the development trend of mobile communication base stations is broadband and large coverage. However, once a base station in a conventional technology is built, an antenna of another antenna frequency band cannot be added, or a relatively high expense needs to be spent to improve the base station. Therefore, the embodiments of this application provide an antenna system to improve a frequency band of a base station and communication performance of the base station.

An antenna system provided in the embodiments of this application includes at least two antenna arrays, and each antenna array includes a plurality of antennas arranged in arrays. Each antenna array operates on a different operating frequency band. For example, if the antenna system includes a first antenna array and a second antenna array, the first antenna array and the second antenna array operate on two different operating frequency bands; or if the antenna system includes a first antenna array, a second antenna array, and a third antenna array 60, the first antenna array, the second antenna array, and the third antenna array 60 all operate on different operating frequency bands. The antenna system provided in the embodiments of this application is described in detail below with reference to the accompanying drawings. However, it should be understood that antenna systems shown in the accompanying drawings are merely implementations for ease of describing the antenna system. In the antenna system provided in the embodiments of this application, different antenna arrays may be arranged in the deployment manners shown in the accompanying drawings, and are not limited to the deployment schemes shown in the figures.

Figure 1:
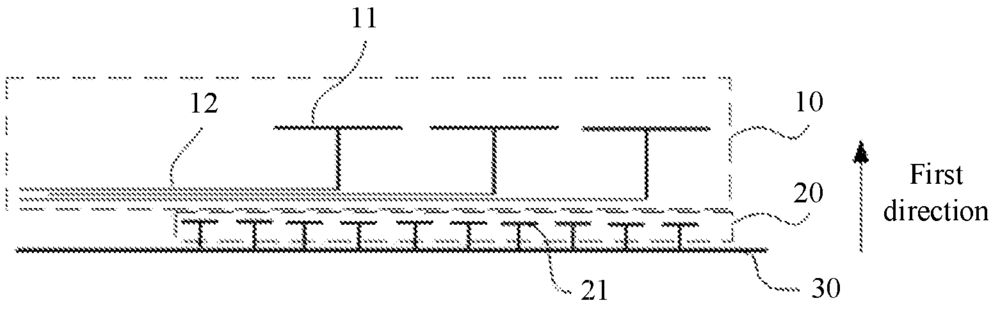
FIG. 1 is a block diagram of a structure of an antenna system according to an embodiment of this application.

As shown in FIG. 1, FIG. 1 shows an antenna system according to an embodiment of this application. The antenna system includes a first antenna array 20 and a second antenna array 10. The first antenna array 20 and the second antenna array 10 are antennas operating on different operating frequency bands. For example, the first antenna array 20 is 5G antennas, and the second antenna array 10 is 2G, 3G, or 4G antennas. Alternatively, the first antenna array 20 is 2G, 3G, or 4G antennas, and the second antenna array 10 is 5G antennas.

The first antenna array 20 includes a plurality of first antennas 21 arranged in arrays. Only one column of first antennas are shown in FIG. 1. However, it should be understood that a quantity of columns of first antennas 21 is not limited in this embodiment of this application. A plurality of columns of first antennas 21 may be selectively disposed as required, for example, two columns, three columns, or four columns of first antennas 21. When the first antenna array 20 operates, the first antenna array 20 is fed through a first feeding network (not shown in the figure).

The second antenna array 10 includes a plurality of second antennas 11 arranged in arrays. Only one column of second antennas 11 are shown in FIG. 1. However, a quantity of second antennas 11 is not limited in this embodiment of this application. A plurality of columns of second antennas 11 may be disposed as required, for example, two columns, three columns, or four columns of second antennas 11. When the second antenna array 10 operates, the second antenna array 10 is fed by a second feeding network 12. The second feeding network 12 is connected to a plurality of second antennas.

Still refer to FIG. 1. The antenna system further includes a first reflection panel 30. The first antenna array 20 and the second antenna array 10 are stacked on the first reflection panel 30 along a first direction. In FIG. 1, the direction indicated by the arrow is the first direction, and the first direction is a direction perpendicular to a reflection surface of the first reflection panel 30. As shown in FIG. 1, the first antennas 21 in the first antenna array 20 are fixedly disposed on the reflection surface of the first reflection panel 30, and the first feeding network is disposed on a side of the first reflection panel 30 that is away from the reflection surface. The second antennas 11 in the second antenna array 10 and the second feeding network 12 are disposed at positions away from the first reflection panel 30. As shown in FIG. 1, the second feeding network 12 is disposed between the second antenna array 10 and the first antenna array 20.

Still refer to FIG. 1. As can be learned from FIG. 1, the first antenna array 20 and the first reflection panel 30 are disposed as a whole, and therefore, may be used as one module. The second antenna array 10, the first antenna array 20, and the first reflection panel 30 are disposed at intervals. For example, an antenna array is disposed on an existing base station. When the first antenna array 20 needs to be added, a reflection panel of the existing antenna array is removed, and antennas in the existing antenna array are fastened by using a reinforcing structure (such as a radome or a support frame). Then, a module including the added antenna array and a reflection panel is added to a side of the antenna array that is opposite to the first direction, to form the structure shown in FIG. 1. The first antenna array 20 is the existing antenna array, and the second antenna array 10 is the added antenna array. Alternatively, an added antenna array is directly disposed in front of (a side indicated by the first direction) an existing antenna array, to form the structure shown in FIG. 1. The existing antenna array may be the first antenna array 20 in FIG. 1, and the added antenna array may be the second antenna array 10. By using the foregoing manner, the base station does not need to be refit in a large scale, thereby facilitating addition of a communication frequency band of the base station and improving a communication effect of the base station.

Figure 2:
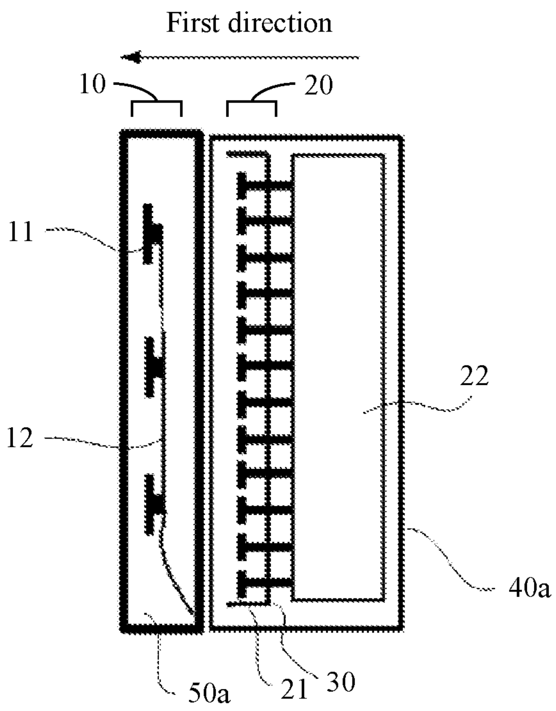
FIG. 2 is a block diagram of a structure of another antenna system according to an embodiment of this application.

Refer to FIG. 2. FIG. 2 shows another implementation of an antenna system. For a same reference number in FIG. 2, refer to the reference number in FIG. 1. For a first antenna array 20 and a second antenna array 10 shown in FIG. 2, refer to the related descriptions of the first antenna array 20 and the second antenna array 10 in FIG. 1. Still refer to FIG. 2. In addition to the first antenna array 20 and the second antenna array 10 shown in FIG. 1, the antenna system shown in FIG. 2 further includes a first radome 40*a* and a second radome 50*a*. The first radome 40*a* and the second radome 50*a* are arranged in a first direction. The second antennas 11 in the second antenna array 10 and the second feeding network 12 are both disposed in the second radome 50*a*. The first antenna array and the first reflection panel 30 are disposed in the first radome 40*a*. FIG. 2 further shows a first phase shifter 22 of the first antenna array 20. The first phase shifter 22 is disposed in the first radome 40*a*, and the first phase shifter 22 is connected to a plurality of first antennas 21 through a first feeding network and transmits a signal to the first antennas 21. As can be learned from FIG. 2, the first antenna array 20 and the first reflection panel 30 form one module by using the first radome 40*a*. During assembly, the first radome 40*a* may be directly disposed on a side of the second radome 50*a* that is opposite to the first direction.

Figure 3:
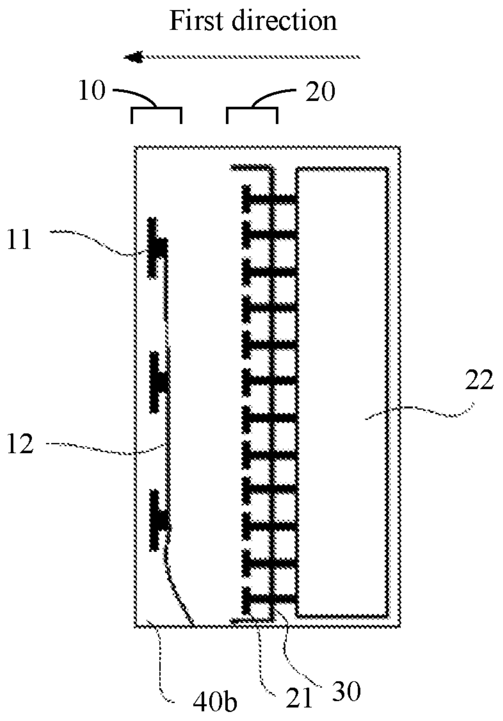
FIG. 3 is a block diagram of a structure of another antenna system according to an embodiment of this application.

As shown in FIG. 3, FIG. 3 is a modification of the antenna system shown in FIG. 2. In an antenna system shown in FIG. 3, a first antenna array 20 and a second antenna array 10 are the same as the first antenna array 20 and the second antenna array 10 in FIG. 2. A difference is that only one first radome 40*b* is disposed in FIG. 3; and the second antenna array 10, a second feeding network 12, the first antenna array 20, and a first reflection panel 30 are sequentially arranged along a first direction and are disposed in a same radome (the first radome 40*b*). It should be understood that the examples of the antenna systems shown in FIG. 2 and FIG. 3 may be selectively disposed based on actual conditions. Different antenna arrays may be disposed in different radomes or a same radome. This is not limited in this embodiment of this application.

Figure 4:
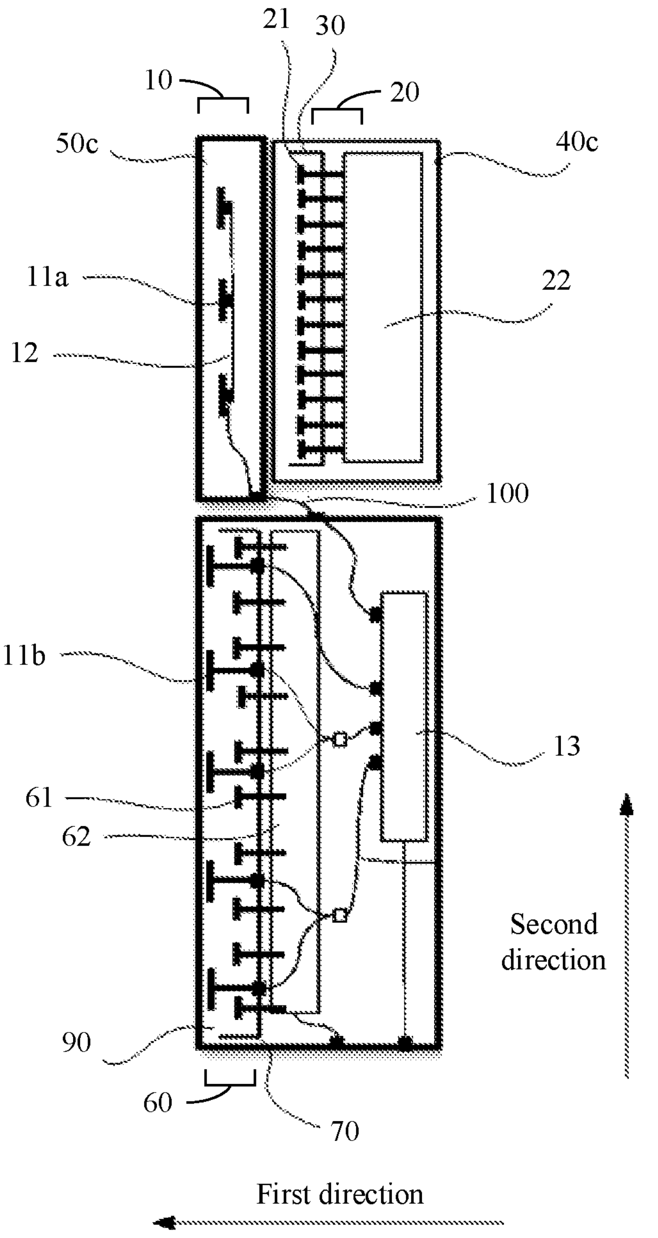
FIG. 4 is a block diagram of a structure of another antenna system according to an embodiment of this application.

As shown in FIG. 4, FIG. 4 shows an example of an implementation in which an antenna system includes three antenna arrays. For a same reference number in FIG. 4, refer to the same reference number in FIG. 1. The antenna system shown in FIG. 4 includes a first antenna array 20, a second antenna array 10, and a third antenna array 60. As shown in FIG. 4, first antennas 21 in the first antenna array 20 are disposed on a first reflection panel 30 and are connected to a first phase shifter 22 through a first feeding network. The first antenna array 20, the first reflection panel 30, and the first phase shifter 22 are disposed in a first radome 40*c*. A plurality of second antennas 11 in the second antenna array 10 are divided into two parts, which are a first part of second antennas 11*a* and a second part of second antennas 11*b*. The first part of second antennas 11*a* include a plurality of second antennas 11*a*, and the second part of second antennas 11*b* include a plurality of second antennas 11*b*. The first part of second antennas 11*a* and a second feeding network 12 correspondingly connected to the first part of second antennas 11*a* are disposed in a second radome 50*c*. Still refer to FIG. 4, the third antenna array 60 includes a plurality of third antennas 61, and the third antenna array 60 is fed by a third feeding network. The second part of second antennas 11*b* and the third antenna array 60 are disposed on a second reflection panel 70; and the second part of second antennas 11*b*, the third antenna array 60, and the second reflection panel 70 are arranged in a first direction. The second part of second antennas 11*b*, the third antenna array 60, and the second reflection panel 70 are disposed in a third radome 90. In the antenna system shown in FIG. 4, a second phase shifter 13 and a third phase shifter 62 are further shown. The second phase shifter 13 and the third phase shifter 62 are arranged in the third radome 90 along the first direction. The second phase shifter 13 is connected to the second phase shifter 13 through the second feeding network corresponding to the second part of second antennas 11*b*. The second feeding network 12 corresponding to the first part of second antennas 11*a* is connected to the second phase shifter 13 through a jumper 100 between the second radome 50*c* and the third radome 90. The third antenna array 60 is connected to the third phase shifter 62 through a third feeding network.

Still refer to FIG. 4. The first radome 40*c* and the second radome 50*c* are arranged along a first direction; and the first radome 40*c*, the second radome 50*c*, and the third radome 90 are arranged along a second direction. As shown in the directions indicated by the arrows in FIG. 4, the second direction is a direction perpendicular to the first direction. In the antenna system shown in FIG. 4, the first reflection panel 30 and the second reflection panel 70 are also arranged along the second direction, so that the second reflection panel 70 and the first antenna array 20 are staggered in space, in other words, the second reflection panel 70 is in an area in which the plurality of first antennas 21 are not overlapped, to prevent the second reflection panel 70 from blocking signal radiation of the first antennas 21, and reduce impact from the second reflection panel 70 on the first antennas 21.

Figure 5:
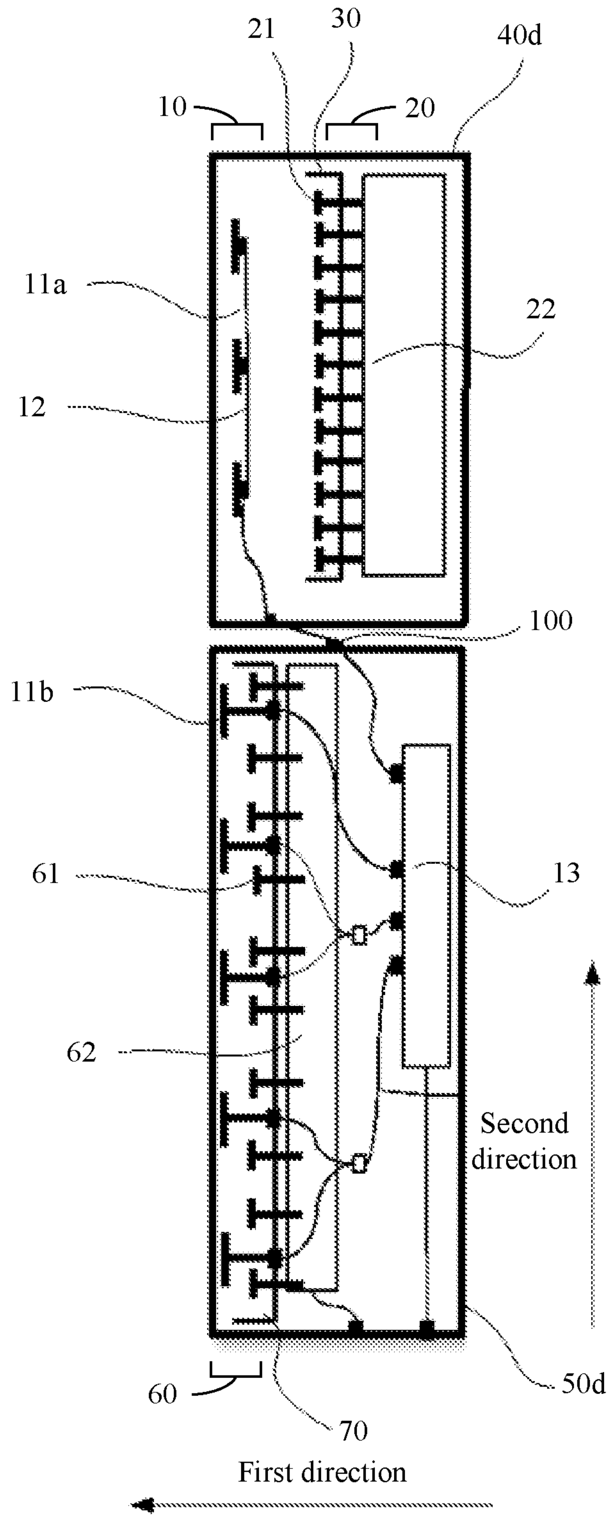
FIG. 5 is a block diagram of a structure of another antenna system according to an embodiment of this application.

An arrangement manner for the radome provided in the embodiments of this application is not limited to the manner shown in FIG. 4. When the first antenna array 20, the second antenna array 10, and the third antenna array 60 are arranged in the manner shown in FIG. 4, the radome shown in FIG. 3 may further be applied to FIG. 4 to form the antenna system shown in FIG. 5. The first radome 40*c* and the second radome 50*c* in FIG. 4 may be combined into a first radome 40*d*, and another radome is a second radome 50*d*. The first radome 40*d* and the second radome 50*d* are arranged along the second direction. The first part of second antennas 11*a*, the first antenna array 20, and the first reflection panel 30 are disposed in the first radome. The second part of second antennas 11*b*, the second reflection panel 70, and the second phase shifter 13 of the second antenna array 10 are disposed in the second radome.

Figure 6:
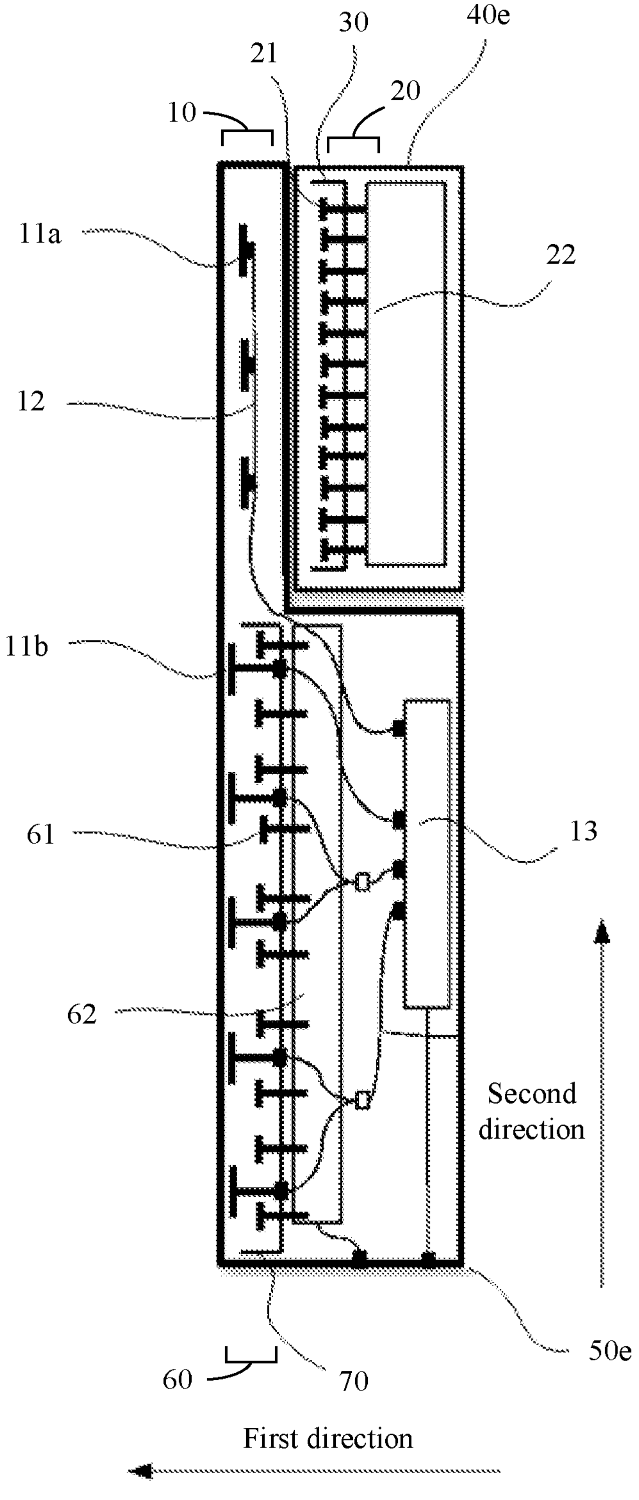
FIG. 6 is a block diagram of a structure of another antenna system according to an embodiment of this application.

As shown in FIG. 6, FIG. 6 shows an example of another implementation in which an antenna system includes three antenna arrays. For a same reference number in FIG. 6, refer to the same reference number in FIG. 4. The antenna system shown in FIG. 6 includes a first antenna array 20, a second antenna array 10, and a third antenna array 60. Structures of the three antenna arrays are the same as the structures shown in FIG. 4. Details are not described herein again. The antenna system shown in FIG. 6 includes two radomes, which are a first radome 40*e* and a second radome 50*e*. As shown in FIG. 6, the second radome 50*e* is an L-shaped cover, the upper right corner of the second radome 50*e* has a notch (an arrangement direction of the antenna system in FIG. 6 is used as a reference direction), and the first radome 40*e* is disposed at the notch position of the second radome 50*e*. Still refer to FIG. 6. A plurality of first antennas 21, the first reflection panel 30, and the first phase shifter 22 are arranged in the first radome 40*e* along a first direction. The second radome 50*e* is an L-shaped structure. The first radome 40*e* is located at the notch position of the second radome 50*e*. The first part of second antennas 11*a* are located in the second radome 50*e* and are stacked with the first antenna 21 and the first reflection panel 30 along the first direction. The second part of second antennas 11*b*, the third antenna array 60, the second reflection panel 70, the third phase shifter 62, and the second phase shifter 13 are stacked in the second radome 50*e* along the first direction.

Figure 7:
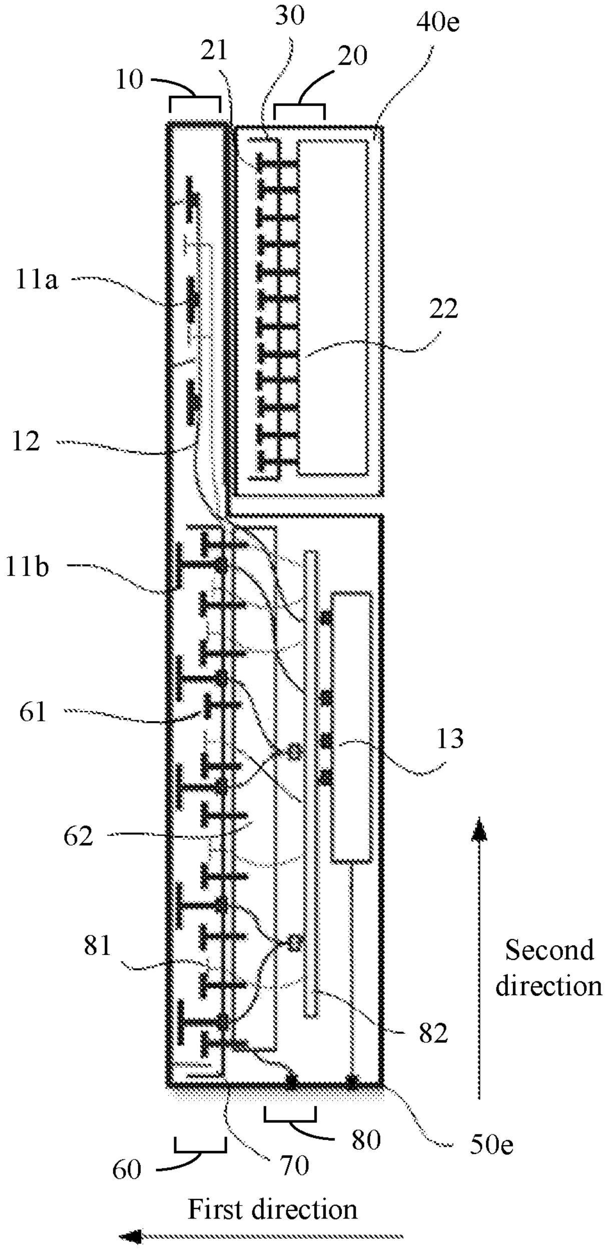
FIG. 7 is a block diagram of a structure of another antenna system according to an embodiment of this application.

As shown in FIG. 7, FIG. 7 shows another structure of an antenna system. For a reference number in FIG. 7, refer to the same reference number in FIG. 6. A difference between the antenna system shown in FIG. 7 and the antenna system shown in FIG. 6 is that a fourth antenna array 80 is added to the antenna system shown in FIG. 7. A first antenna array 20, a second antenna array 10, a third antenna array 60, and the fourth antenna array 80 are antenna arrays operating on different frequency bands. For example, the operating frequency band of the first antenna array 20 is 5G, the operating frequency band of the second antenna array 10 is 4G, the operating frequency band of the third antenna array 60 is 3G, and the operating frequency band of the fourth antenna array 80 is 2G. Still refer to FIG. 7. The first antenna array 20, the second antenna array 10, and the third antenna array 60 are disposed in a manner the same as that shown in FIG. 6. Details are not described herein again. The fourth antenna array 80, the second antenna array 10, and the third antenna array 60 are stacked on a second reflection panel 70. For example, the fourth antenna array 80 includes a plurality of fourth antennas 81. A fourth phase shifter 82 feeds the fourth antenna array 80 through a fourth feeding network. During arrangement of the fourth antenna array 80, the fourth antenna array 80 and the third antenna array 60 are located on a same side of the second reflection panel 70, and the fourth antenna array 80 is fixedly disposed on the second reflection panel 70. The fourth phase shifter 82 and the fourth antennas 81 are separately arranged on two sides of the second reflection panel 70.

It should be understood that the antenna arrays included in the antenna systems shown in FIG. 4 to FIG. 7 are merely examples. A quantity of antenna arrays and a combination manner are not limited in the embodiments of this application. For example, the antenna systems provided in the embodiments of this application may use a manner shown in FIG. 6 in which the second antenna array 10 and the third antenna array 60 are disposed in one radome and the first antenna array 20 is disposed in another radome, may use a manner in which the second antenna array 10 is independently disposed in one radome and the first antenna array 10 and the third antenna array 60 are disposed in one radome, may use a manner in which the first antenna array 20 and the second antenna array 10 are disposed in one radome and the third antenna array 60 is independently disposed in one radome, and so on. The first antenna array 20, the second antenna array 10, and the third antenna array 60 may be randomly arranged as required. Corresponding radomes may be accordingly assembled based on the arrangement manner for the first antenna array 20, the second antenna array 10, and the third antenna array 60.

An embodiment of this application further provides a base station. The base station includes any one of the foregoing antenna systems and a digital phase shifter connected to the antenna system. As can be learned from the foregoing antenna systems, in the base station provided in this embodiment of this application, different modules may be added to the antenna systems as required to improve communication performance of the existing base station, thereby reducing costs of refitting the base station.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An antenna system, comprising:

a first radome and a second radome, wherein the first radome and an upper part of the second radome are arranged in a first direction;

a first reflection panel located within the first radome;

a first antenna array located within the first radome, the first antenna array comprising first antennas, the first reflection panel and the first antenna array being arranged in the first radome along the first direction, and the first direction is perpendicular to a reflection surface of the first reflection panel; and a second antenna array located within the second radome, the second antenna array comprising a first part of second antennas located within the upper part of the second radome and a second part of the second antennas located within a lower part of the second radome;

a second reflection panel located within the lower part of the second radome; and a third antenna array located within the lower part of the second radome, the third antenna array and the second part of the second antennas being stacked on the second reflection panel in the lower part of the second radome along the first direction;

wherein the first antenna array, the second antenna array, and the third antenna array operate on different frequency bands.

2. The antenna system according to claim 1, further comprising a second feeding network disposed in the second radome.

3. The antenna system according to claim 2, wherein:

the second antenna array, the second feeding network, the third antenna array, and the second reflection panel are disposed in the second radome.

4. The antenna system according to claim 1, further comprising a fourth antenna array, wherein the first antenna array, the second antenna array, the third antenna array, and the fourth antenna array operate on different frequency bands; and the fourth antenna array, the second part of the second antenna array, and the third antenna array are stacked on the second reflection panel.

5. The antenna system according to claim 1, wherein the second radome is an L-shaped cover, the upper part of the second radome has a notch, and the first radome is disposed at the notch of the second radome.

6. The antenna system according to claim 1, the first reflection panel and the second reflection panel are arranged along a second direction, wherein the second direction is perpendicular to a first direction.

7. The antenna system according to claim 1, wherein the antenna system further comprises a first phase shifter, and the first phase shifter is disposed on a side of the first reflection panel that is away from the reflection surface.

8. The antenna system according to claim 1, wherein the antenna system further comprises a second phase shifter and a third phase shifter, and the second phase shifter and a third phase shifter are disposed on a side of the second reflection panel that is away from a reflection surface of the second reflection panel.

9. The antenna system according to claim 8, the antenna system further comprises a second feeding network and a third feeding network, wherein the second phase shifter is connected to the first part of the second antennas through the second feeding network corresponding to the first part of the second antennas, and is connected to the second part of the second antennas through the second feeding network corresponding to the second part of the second antennas; and the third antenna array is connected to the third phase shifter through the third feeding network.

10. An antenna system, comprising:

a second radome, wherein an upper part of the second radome are arranged with a first radome in a first direction;

a second antenna array comprising a first part of second antennas and a second part of the second antennas;

a second reflection panel; and a third antenna array;

wherein the first part of the second antennas is located within the upper part of the second radome and are arranged with the first radome along a first direction; and the third antenna array and the second part of the second antennas are stacked on the second reflection panel in the lower part of the second radome along the first direction.

11. The antenna system according to claim 10, wherein the second radome is an L-shaped cover, the upper part of the second radome has a notch, wherein the notch is configured to dispose a first radome.

12. The antenna system according to claim 11, wherein the antenna system further comprises a second phase shifter and a third phase shifter, and the second phase shifter and a third phase shifter are disposed on a side of the second reflection panel that is away from a reflection surface of the second reflection panel.

13. The antenna system according to claim 12, the antenna system further comprises a second feeding network and a third feeding network, wherein the second phase shifter is connected to the first part of the second antennas through the second feeding network corresponding to the first part of the second antennas, and is connected to the second part of the second antennas through the second feeding network corresponding to the second part of the second antennas; and the third antenna array is connected to the third phase shifter through the third feeding network.

14. The antenna system according to claim 10, wherein the second feeding network corresponding to the first part of the second antennas is located in the upper part of the second radome, and the second feeding network corresponding to the second part of the second antennas is located in the lower part of the second radome.

* * * * *